(12) United States Patent
O'Hare et al.

(10) Patent No.: US 11,652,861 B2
(45) Date of Patent: May 16, 2023

(54) CONTENT SEGMENT DETECTION AND REPLACEMENT

(71) Applicant: Comcast Cable Communications, LLC, Philadelphia, PA (US)

(72) Inventors: David A. O'Hare, Glendale, CO (US); Weidong Mao, West Windsor, NJ (US); Elad Nafshi, Bryn Mawr, PA (US); Mark Vickers, Marina del Rey, CA (US); Gregory Allen Broome, Broomfield, CO (US); Sree Kotay, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/534,207

(22) Filed: Nov. 23, 2021

(65) Prior Publication Data
US 2022/0086206 A1    Mar. 17, 2022

Related U.S. Application Data

(63) Continuation of application No. 16/790,454, filed on Feb. 13, 2020, which is a continuation of application
(Continued)

(51) Int. Cl.
| | | |
|---|---|---|
| *H04L 65/61* | (2022.01) | |
| *G06Q 30/02* | (2023.01) | |
| *H04N 7/173* | (2011.01) | |
| *H04N 21/234* | (2011.01) | |
| *H04N 21/44* | (2011.01) | |

(Continued)

(52) U.S. Cl.
CPC ............ *H04L 65/61* (2022.05); *G06Q 30/02* (2013.01); *H04L 65/611* (2022.05); *H04N 7/17318* (2013.01); *H04N 21/23424* (2013.01); *H04N 21/44016* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 7,519,273 B2 | 4/2009 | Lowthert et al. | |
| 9,319,443 B2 | 4/2016 | O'Hare et al. | |

(Continued)

FOREIGN PATENT DOCUMENTS

| | | |
|---|---|---|
| CA | 2855183 A1 | 12/2014 |
| EP | 2464133 A1 | 6/2012 |
| EP | 2819425 A1 | 12/2014 |

OTHER PUBLICATIONS

European Search Report dated Nov. 6, 2014 for European Patent Application No. 14174100.9, which was filed on Jun. 26, 2014 and published as EP 2819425 on Dec. 31, 2014 (Applicant—Comcast Cable communications, LLC. (7 Pages).

*Primary Examiner* — Jeffrey R Swearingen
(74) *Attorney, Agent, or Firm* — Ballard Spahr LLP

(57) ABSTRACT

Methods and systems for providing content are disclosed. One method can comprise receiving a request for content comprising at least a first segment. The method can also comprise determining an expiration condition of the first segment, and replacing the first segment with a second segment based on the expiration condition. The method can also comprise providing the second segment to a user or a device.

30 Claims, 7 Drawing Sheets

Related U.S. Application Data

No. 15/946,464, filed on Apr. 5, 2018, now Pat. No. 10,623,457, which is a continuation of application No. 15/065,222, filed on Mar. 9, 2016, now Pat. No. 9,967,301, which is a continuation of application No. 13/927,804, filed on Jun. 26, 2013, now Pat. No. 9,319,443.

(51) Int. Cl.
*H04N 21/81* (2011.01)
*H04L 65/611* (2022.01)

(56) References Cited

U.S. PATENT DOCUMENTS

| | | |
|---|---|---|
| 9,967,301 B2 | 5/2018 | O'Hare et al. |
| 10,623,457 B2 | 4/2020 | Ohare et al. |
| 2004/0003398 A1 | 1/2004 | Donian et al. |
| 2004/0221311 A1 | 11/2004 | Dow et al. |
| 2005/0039205 A1 | 2/2005 | Riedl |
| 2005/0060745 A1* | 3/2005 | Riedl ............... H04N 21/25883 348/E7.071 |
| 2005/0193408 A1 | 9/2005 | Sull et al. |
| 2005/0193425 A1 | 9/2005 | Sull et al. |
| 2007/0265977 A1 | 11/2007 | Read |
| 2007/0276926 A1 | 11/2007 | LaJoie et al. |
| 2009/0083788 A1* | 3/2009 | Russell ............... G06Q 30/0207 705/14.1 |
| 2009/0094634 A1 | 4/2009 | Haberman et al. |
| 2009/0178089 A1 | 7/2009 | Picco et al. |
| 2009/0265733 A1 | 10/2009 | McKelvey |
| 2010/0269128 A1 | 10/2010 | Gordon |
| 2011/0142417 A1 | 6/2011 | Wilson et al. |
| 2012/0117584 A1 | 5/2012 | Gordon |
| 2012/0163774 A1 | 6/2012 | Harper et al. |
| 2013/0086601 A1 | 4/2013 | Adimatyam et al. |
| 2013/0139193 A1 | 5/2013 | Fan et al. |
| 2015/0006752 A1 | 1/2015 | O'Hare et al. |
| 2016/0261659 A1 | 9/2016 | O'Hare et al. |
| 2019/0081995 A1 | 3/2019 | Ohare et al. |

\* cited by examiner

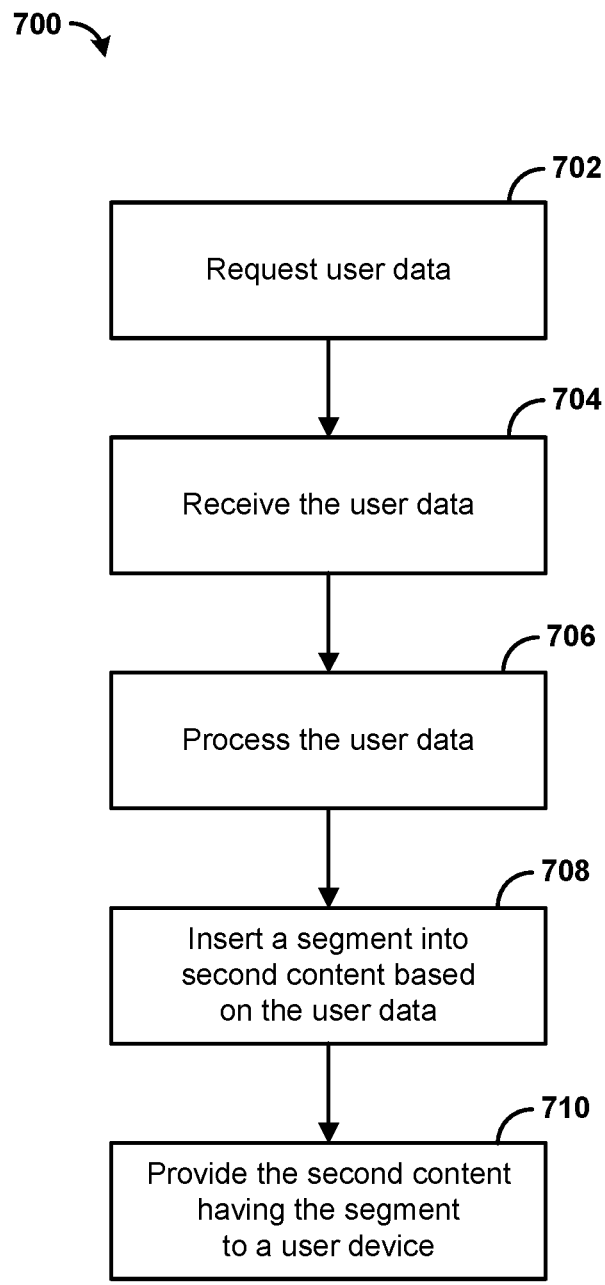

CONTENT SEGMENT DETECTION AND REPLACEMENT

CROSS REFERENCE TO RELATED APPLICATIONS

This application is a continuation of U.S. Non-Provisional application Ser. No. 16/790,454, filed on Feb. 13, 2020, which is a continuation of U.S. Non-Provisional application Ser. No. 15/946,464, filed on Apr. 5, 2018, and issued as U.S. Pat. No. 10,623,457 on Apr. 14, 2020, which is a continuation of U.S. Non-Provisional application Ser. No. 15/065,222, filed on Mar. 9, 2016, and issued as U.S. Pat. No. 9,967,301 on May 8, 2018, which is a continuation of U.S. Non-Provisional application Ser. No. 13/927,804, filed on Jun. 26, 2013, and issued as U.S. Pat. No. 9,319,443 on Apr. 19, 2016, each of which are incorporated by reference in their entireties herein.

BACKGROUND

Traditionally consumer content has been broadcast on a variety of channels through a variety of mediums. Broadcasting allows many users in one area to access the content at the time the content is broadcasted from the content provider. Broadcasted content is made available to a large audience and is not customized to individual consumers. Broadcast content or parts of the broadcast content can become outdated if viewed at a time later than the original broadcast. Additionally, even content that is customized to a particular consumer or group of consumers can become outdated when viewed after the original time of delivery. Thus, there is a need for more sophisticated systems and methods for providing content.

SUMMARY

It is to be understood that both the following general description and the following detailed description are exemplary and explanatory only and are not restrictive, as claimed. Disclosed are methods and systems for providing content. An example method can comprise receiving a request for content comprising at least a first segment (e.g., advertisement or other content). An expiration condition of the first segment can be determined. The first segment can be replaced with a second segment based on the expiration condition. Additionally, the second segment can be transmitted to users in response to the request.

In one aspect, an example method can comprise receiving user data. The user data can indicate first content scheduled to be recorded on a user device. A segment can be inserted into second content based on the user data. The second content having the segment can be provided to a user device. Additional aspects and advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 is a flowchart illustrating another example method for providing content.

DETAILED DESCRIPTION

Figure 1:
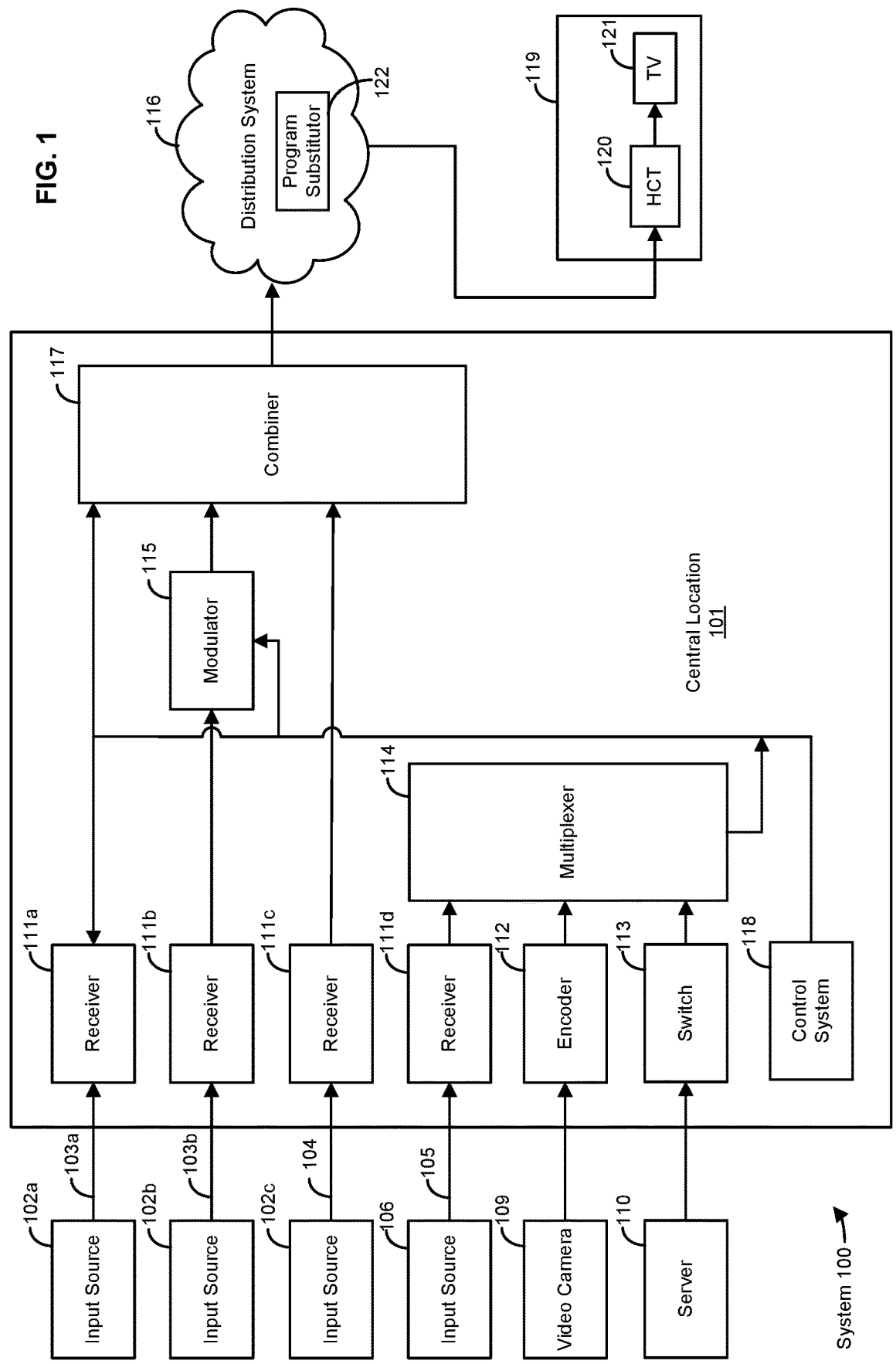
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing custom content. For example, recorded content can be customized at the time the content is recorded or at a later time when a part of the content has become outdated. As explained in further detail below, the recorded content can be customized at the content provider end, at the content consumer end, or at any point therebetween, based on demographics, geographic location, user device, user device settings, user subscription level, expiration conditions, and the like. Additionally, a history and/or schedule of content recordings can be used to customize content.

FIG. 1 is a block diagram illustrating various aspects of an example system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a data processing facility, such as a headend), which can receive or create content (e.g., data, input programming, and the like) from multiple sources. The central location 101 can combine the content from the various sources and can distribute the content to specific devices or user (e.g., subscriber) locations (e.g., location 119) via distribution system 116.

In an aspect, the central location 101 can receive content from a variety of sources 102*a*, 102*b*, 102*c*. The content can be transmitted from the source to the central location 101 via a variety of transmission paths, including wireless (e.g. satellite paths 103*a*, 103*b*) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111*a*, 111*b*, 111*c*, 111*d* that are each associated with an input source. For example, MPEG encoders such as encoder 112, are included for encoding local content or a video camera 109 feed. A switch 113 can provide access to server 110, which can be a database, a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. In one aspect, the distribution system 116 can comprise one or more program substitutors 122 configured to insert and/or replace content or content segments before the content is distributed at user location 119. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within the central location 101 and/or the user location 119. For example, methods and systems can be located within servers 110, program substitutors 122, third party content servers at another location, and the like. As described in more detail herein, the program substitutors 122 or other devices can provide replacement content for a particular user location 119. As another example, the server 110 can be configured to insert and/or replace a content segment in content that is provided at the user location 119. Additionally, various input sources 102a, 102b, and 102c can be selected to provide replacement content segments in content provided at the user location 119.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. In an exemplary embodiment, the present methods and systems can employ transmission of MPEG packets. However, the present methods and systems are not so limited, and can be implemented using other types of transmission and data.

Figure 2:
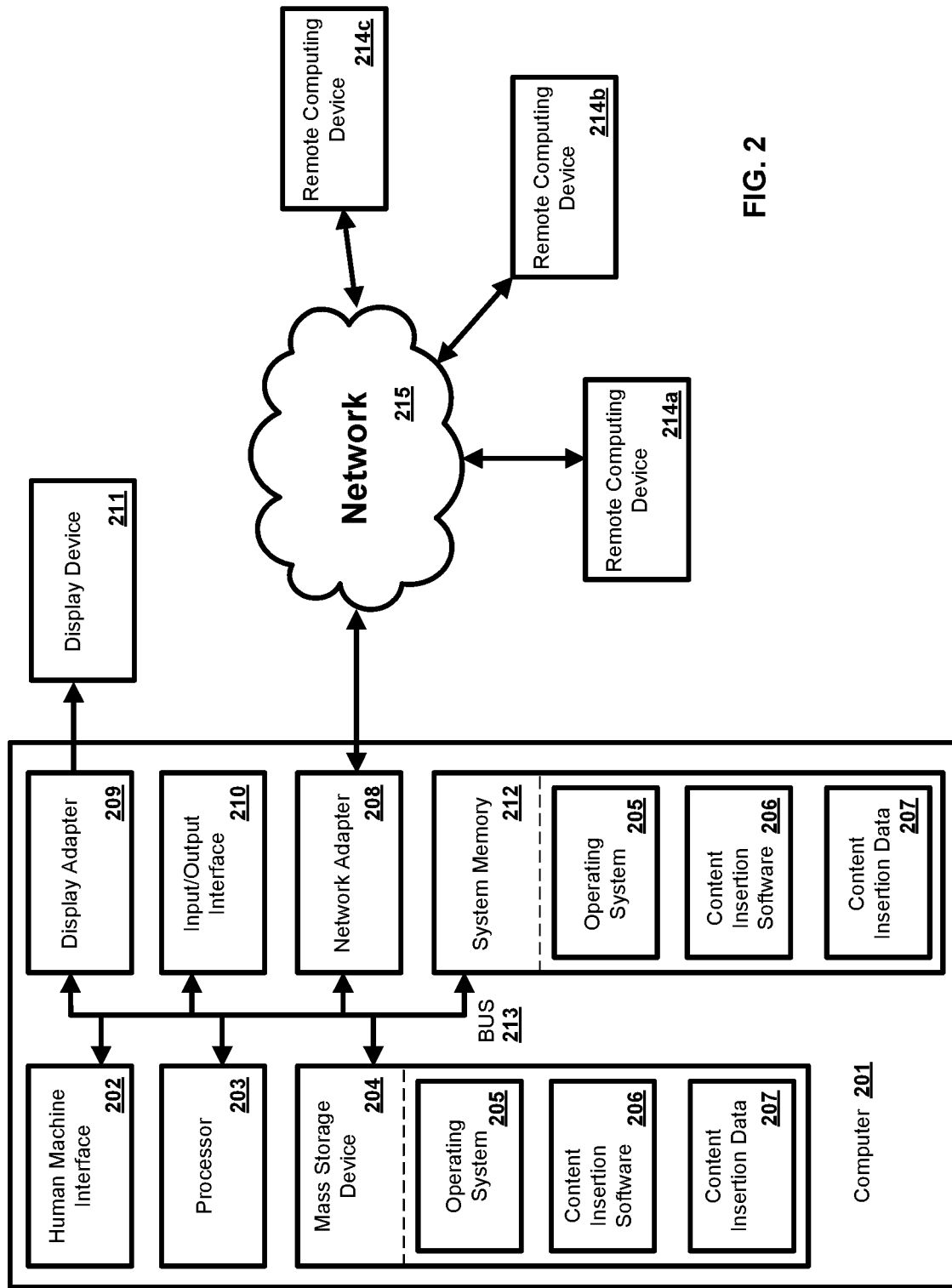
FIG. 2 is a block diagram illustrating an example computer system in which the present methods and systems can operate.

In an exemplary aspect, the methods and systems can be implemented on a computing device 201 as illustrated in FIG. 2 and described below. By way of example, user device 306 of FIG. 3, content device 402 of FIG. 4, the content source 504 of FIG. 5 can, for example, be computing devices as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, content insertion software 206, content insertion data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as content insertion data 207 and/or program modules such as operating system 205 and content insertion software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and content insertion software 206. Each of the operating system 205 and content insertion software 206 (or some combination thereof) can comprise elements of the programming and the content insertion software 206. Content insertion data 207 can also be stored on the mass storage device 204. Content insertion data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of content insertion software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
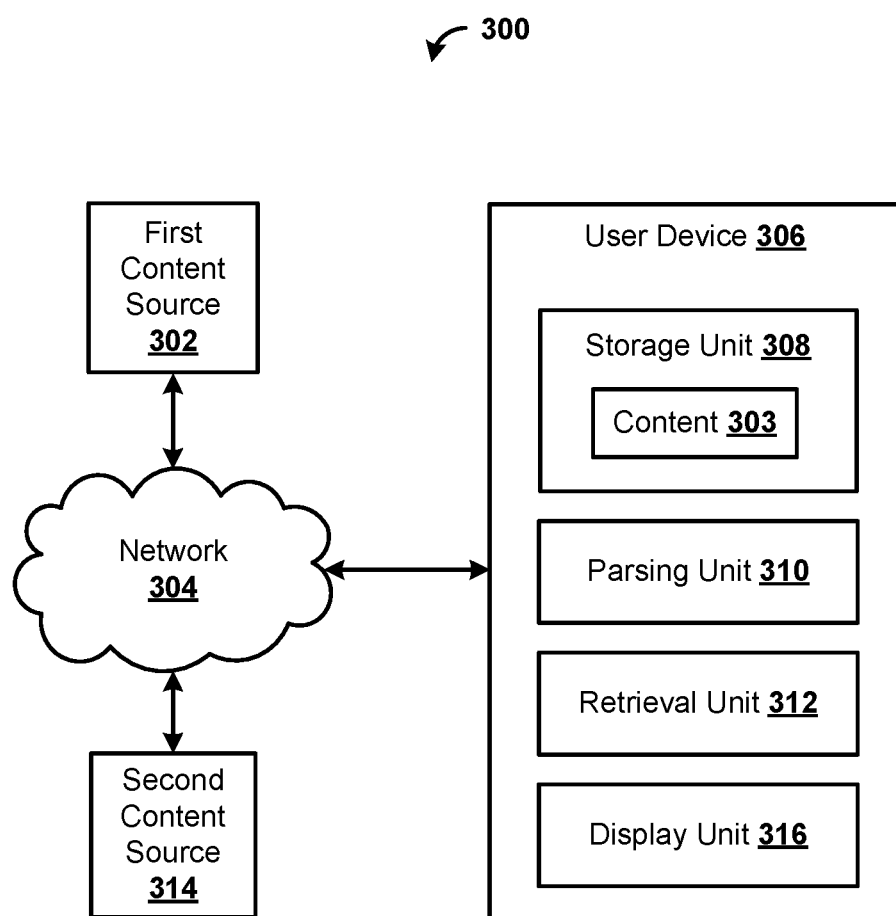
FIG. 3 is a block diagram illustrating an example system for providing content.

FIG. 3 is a block diagram illustrating an example system 300 for providing content. In one aspect, the system 300 can comprise a first content source 302 configured to provide content 303 over a network 304. For example, the first content source 302 can comprise all or a portion of the system 100 described above. As another example, the network 304 can comprise the distribution system 116 described above.

The system 300 can further comprise a user device 306 configured to receive content 303 from the first content source 302 through the network 304 (and/or additional networks) and provide content 303 to a user. The user device 306 can comprise a personal computer, set-top box, digital streaming device, television, tablet device, mobile device (e.g., smart phone), or another electronic device. In an aspect, the user device 306 can comprise a storage unit 308 configured to store content 303. For example, the storage unit 308 can comprise a digital video recorder (DVR) configured to store (e.g., persist, record, save in non-volatile memory) content received by the user device 306 from the first content source 302.

In another aspect, the user device 306 can comprise a parsing unit 310 configured to detect content segments (e.g., one or more content fragments) of the content 303. For example, content provided to a user device 306 can comprise a plurality of content segments. The content segments can be distinct, controllable elements or portions of data (e.g., content fragments) that together comprise the content 303. In one aspect, a content segment can be a disruption of content (e.g. an advertisement, notification) within particular content (e.g., an episode of a television show). A content segment can be indicated by or comprise one or more markers within the content 303. An exemplary marker can comprise an identifier, date, time and other information and markers for additional control. For example, the marker can comprise a time-related marker. In one aspect, the time-related marker can indicate a date and/or time at which the content expires or otherwise should not be processed or rendered by the user device 306. As another example, the marker can comprise information indicating a target region for the content (e.g., geographic information), and/or topic information indicating a category and/or subject of the content or content segment. Additionally, the marker can comprise a time length of the content or content segment indicating the duration of time of the content or content segment, and/or the location of the segment relative to the content.

In one aspect, markers can be embedded in content (e.g., shows, advertising, and the like) and/or content segments which are provided to the user device 306. In one aspect, the markers can be located at the beginning of the content 303 and/or the beginning of each content segment within the content 303. As an example, the content 303 (e.g., a television show, movie, media clip) can comprise a marker at the beginning of the content 303, and each content segment (e.g., advertisement) contained within the content 303 can comprise a marker. The parsing unit 310 can process (e.g., read, identify information) the markers before the content 303 is provided to the user.

When the parsing unit 310 detects a marker indicating a content segment is expired or otherwise not current, or it is desirable to reproduce the content segment, the parsing unit 310 can evaluate one or more markers or other rules for instructions. In one aspect, the instructions can direct the user device 306 to retrieve (e.g., download, stream) replacement content or segment. For example, a marker in a content segment can indicate that the content segment is expired or that it is otherwise desirable to replace the content segment. The content can be expired, for example, when a current date and/or time is past an expiration date and/or time specified in the marker. Additionally, content 303 can be expired for other reasons, such as when the first content source 302 has indicated that a content segment associated with a particular identifier can no longer be played on a user device 306. As another example, content can be expired after the content has been viewed more than a specified or predetermined number of times. In one aspect, the expiration or other temporal condition can be evaluated differently based on network connectivity of the user device 306. For example, if the user device 106 is temporarily disconnected from the network 304, the content can be determined to be expired based on a different set of rules and/or criteria than if user device 306 is connected to the network 304.

In one aspect, the parsing unit 310 can determine if content is expired based on a user interaction. For example, if a user provides an instruction not to view particular content (e.g., advertisement) or a particular category of content, then the user device 306 can deem the particular content or content associated with the particular category of content as expired. As another example, a user can also provide an instruction that the user is interested in a particular kind of content. In another aspect, the parsing unit 310 can determine if the content is expired based on a viewing history of the user. For example, if the content history indicates that the user has viewed the content a specified number of times, then the content can be deemed to be expired. As a further example, if a content segment was viewed as part of other content, then parsing unit 310 can determine that the content is expired.

In one aspect, the user device 306 can comprise a retrieval unit 312 configured to retrieve replacement content. In one aspect, the retrieval unit 312 can process information detected in the markers identified by the parsing unit 310. Then, the retrieval unit 312 can retrieve replacement content (e.g., replacement content segments). The retrieval unit 312 can select replacement content to replace at least a portion of the content 303 on the user device 306. For example, the retrieval unit 312 can select replacement content based on one or more criteria. The criteria can comprise, for example, an identifier of a content segment, a category, a geographic region, demographic information of one or more users of the user device, a time duration, an aspect ratio, a content resolution, and the like. Alternatively, the retrieval unit 312 can supply the criteria to a second content source 314, and the second content source 314 can select the replacement content based on the criteria. In one aspect, the retrieval unit 312 can be configured to record a history of which content segments (e.g., advertisements) were replaced. The history of which content segments were replaced can be provided to the first content source 302, second content source 314, and/or another device on the network 304.

In one aspect, the system 300 can comprise a second content source 314. The second content source 314 can be configured to receive requests from the user device 306 for content segments. Accordingly, the second content source 314 can provide replacement content segments to the user device 306. In one aspect, the second content source 314 can receive instructions from the user device 306 indicating the criteria for selecting a replacement content segment. The criteria can comprise an identifier of a content segment, a category, a geographic region, demographic information of one or more users of the user device, time duration, aspect ratio, content resolution, and the like. The second content source 314 can apply a decision process to select replacement content segments based on the criteria. Then, the second content source 314 can provide the replacement content segment to the user device 306. In one aspect, the replacement content segment can be provided to the user device 306 through a packet-switched network, such as an Internet Protocol based network or a non-packet switched network (e.g., quadrature amplitude modulation based network).

It should be noted that in some implementations, replacement content segments can be provided to the user device 306 from the first content source 302 or a local cache on the user device 306. It should also be noted that at least some of the content segments associated with content 303 can be replaced many times within the same recorded content (e.g., recorded program, show, movie). For example, each time recorded content 303 is played back by the user device 306, some of the content segments associated with the content 303 can be replaced with an entirely new set of replacement content segments.

In one aspect, the user device 306 can comprise a display unit 316 configured to provide the content 303 to the user. The display unit can also comprise a display screen for presenting content to the user. As the display unit 316 renders and/or provides content to the user, the display unit 316 can detect the markers in the content 303. When a marker indicates that a content segment has expired, the display unit 316 can switch from the expired content segment to a replacement content segment retrieved by the retrieval unit 312. The replacement content segment can be displayed as stored on the user device 306 or the replacement content segment can be streamed by the retrieval unit 312 from the first content source 302 or second content source 314.

Figure 4:
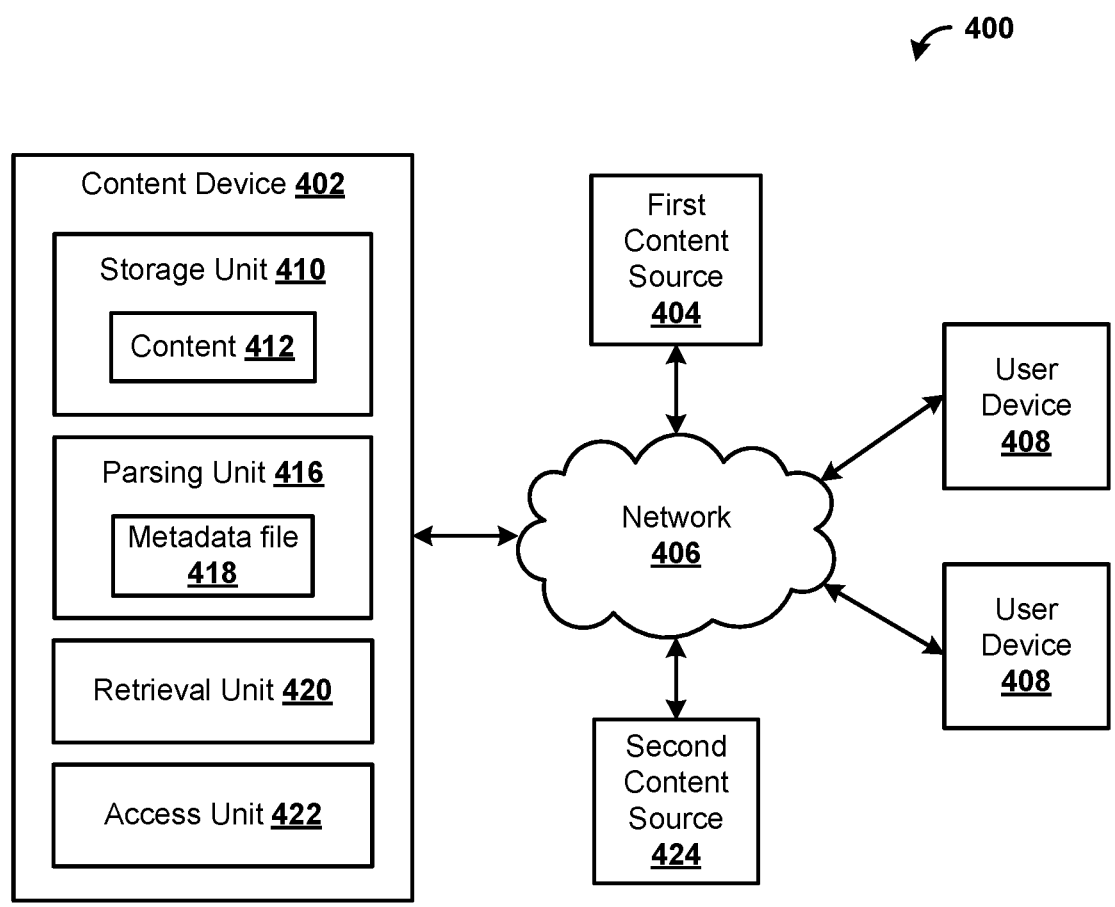
FIG. 4 is a block diagram illustrating another example system for providing content.

FIG. 4 is a block diagram illustrating another example system 400 for providing customized content. In one aspect, the system 400 can comprise a content device 402 configured to receive and process content. In one aspect, the content device 402 can be located the central location 101 of FIG. 1 or other location. The content device 402 can receive content from a content source 404 through a network 406. For example, the network 404 can comprise the distribution system 116 of FIG. 1. The network can be configured to provide content to specified user devices 408. For example, the content device 402 can provide the replacement content through a packet switched network (e.g., Internet Protocol based network) associated with a user device 408. As another example, the content device 402 can provide the replacement content through a non-packet switched network (e.g., quadrature amplitude modulation unicast based network connection) associated with the user device 408.

Additionally, the content device 402 can provide content to one or more user devices 408. For example, the content device 402 can comprise a server or other computing device configured to provide a cloud computing environment such that users can access content from a variety of locations and user devices 408. A user device 408 can comprise a personal computer, set-top box, digital streaming device, television, tablet device, mobile device, or other electronic device. One user can be associated with one or more user devices. The content device 402 can be configured to provide access to content 412 associated with the user from the one or more user devices 408. In another aspect, the content device 402 can be configured as a digital video recorder accessible to users from a variety of locations and user devices 408.

In an aspect, the content device 402 can comprise a storage unit 410 configured to store (e.g., persist, record, save in non-volatile memory) content 412 on the content device 402. For example, a user device 408 can provide the content device 402 with an instruction to store specified content. In one aspect, the specified content can be scheduled to be broadcast from the first content source 404 on a particular day and time. Accordingly, the instruction can indicate the day and time as well as other identifying information, such as a source location, channel broadcasting the content, content identifier, and the like. In one aspect, the content device 402 can receive a plurality of instructions to store content from a plurality of user devices 408.

In an aspect, the content device 402 can comprise a parsing unit 416 configured to detect and evaluate one or more markers in the content 412. For example, the parsing unit 416 can operate in the same manner as the parsing unit 310 of FIG. 3. For example, the parsing unit 416 can process (e.g., read, identify information) markers located in the content 412. The markers can comprise expiration information, content identifiers, content specifications (e.g., format, aspect ratio, resolution, duration), and the like. Additionally, the parsing unit 416 can store information from the markers in a metadata file 418 for later access by the content device 402. The parsing unit 416 can evaluate the markers to determine if an expiration condition is satisfied as described herein (e.g., in the same or similar manner as the parsing unit 310 of FIG. 3).

In one aspect, the metadata file 418 can store a variety of information related to the content. For example, the metadata file 418 can comprise a list of content segments of particular content. The metadata file 418 can comprise identifiers for each content segment and identifiers for the content of which the content segments are a part. In one aspect, the metadata file 418 can comprise an expiration date and expiration time of a content segment. In one aspect, the metadata file 418 can comprise a number of times a content segment has been replaced by another content segment. In another aspect, the metadata file 418 can comprise a number of times the content segments has been played for a user. Similarly, the metadata file 418 can comprise a max number of times a user or all users are authorized to play the content segment. In one aspect, the metadata file 418 can comprise a rating value. For example, the rating value can be compared to a maximum acceptable rating by a user. If the rating value of a content segment exceeds the maximum acceptable rating, the content segment can be replaced. The metadata file 418 can comprise other information such as a compression value, additional control fields, and the like.

In one aspect, the metadata file 418 can be implemented at other locations, such as the user device 408. As another example, the metadata file 418 can be implemented on the user device 306 of FIG. 3. The metadata file 418 can be stored as a database, text file, and/or the like. In one aspect, the metadata file 418 can be updated as content segments are received at the content device 402. For example, the metadata file 418 can be updated as content segments are received as part of a content stream. As another example, the metadata file 418 can be updated as replacement content segments are received by a retrieval unit 420. In one aspect, the updating of the metadata file 418 can trigger the updating of a manifest file associated with the content. For example, if a content segment is replaced in the metadata file 418, the manifest file can be updated with information related to accessing a replacement content segment.

In another aspect, the content device 402 can comprise a retrieval unit 420 configured to retrieve replacement content to replace at least a portion of the content 412. The replacement content can comprise a plurality of replacement content segments. For example, a user device 408 can request content 412 stored by the storage unit 410 on the content device 402. After the content device 402 receives the request, the retrieval unit 420 can access the metadata file 418 to retrieve information about the content. In another aspect, the retrieval unit 420 can retrieve replacement content before the user device 408 requests the content 412. If the information in the metadata file 418 indicates that some of the content segments of the content 412 have expired according to an expiration condition, then the retrieval unit 420 can request replacement content segments from the first content source 404 and/or second content source 424. In one aspect, the retrieval unit 420 can evaluate the expiration condition as described herein (e.g., in the same or similar manner as the parsing unit 310 of FIG. 3). Then, the retrieval unit 420 can download replacement content segments before the content 412 is provided in full or in part to the user. The retrieval unit 420 can select replacement content segments to replace content segments of the content 412. It should be noted that content segments can be replaced more than one time within the content 412. For example, each time the same content is requested by the user device 408, one or more content segments can be replaced with entirely new replacement content segments.

In one aspect, the content device 402 can comprise an access unit 422 configured to provide the content 412 to the user devices 408. The access unit 422 can provide the content along with the replacement content segments to individual user devices 408 through the network 406.

In one aspect, the access unit 422 can receive a request for content from a user device 408. The user device 408 can request the same content at different times and geographic locations. For example, a user can request content by a user device 408 in a first geographic location in a first month and request the same content again by the same user device 408 while in a second geographic location. Additionally, the user can request the same content from a second user device 408. As a further example, a second user can request the content from the first user device 408. Accordingly, each time a user device 408 requests the content, the access unit 422 can provide customized content (e.g., the requested content with some of the content segments replaced) from the retrieval unit 420 based on the information received from the user device. Thus, different user devices 408 associated with the same user or associated with a different user can be provided content with different content segments. Additionally, the same user using the same user device 408 can be provided content with different content segments depending on the time and geographic location of the user device 408 when the content is requested. As a further example, a user device 408 can be provided content on day X, but the user device 408 can wait until day Y to play the content. Accordingly, the user device 408 can request the content again before playback, and the content device 402 can provide the content again but with one or more updated content segments.

Figure 5:
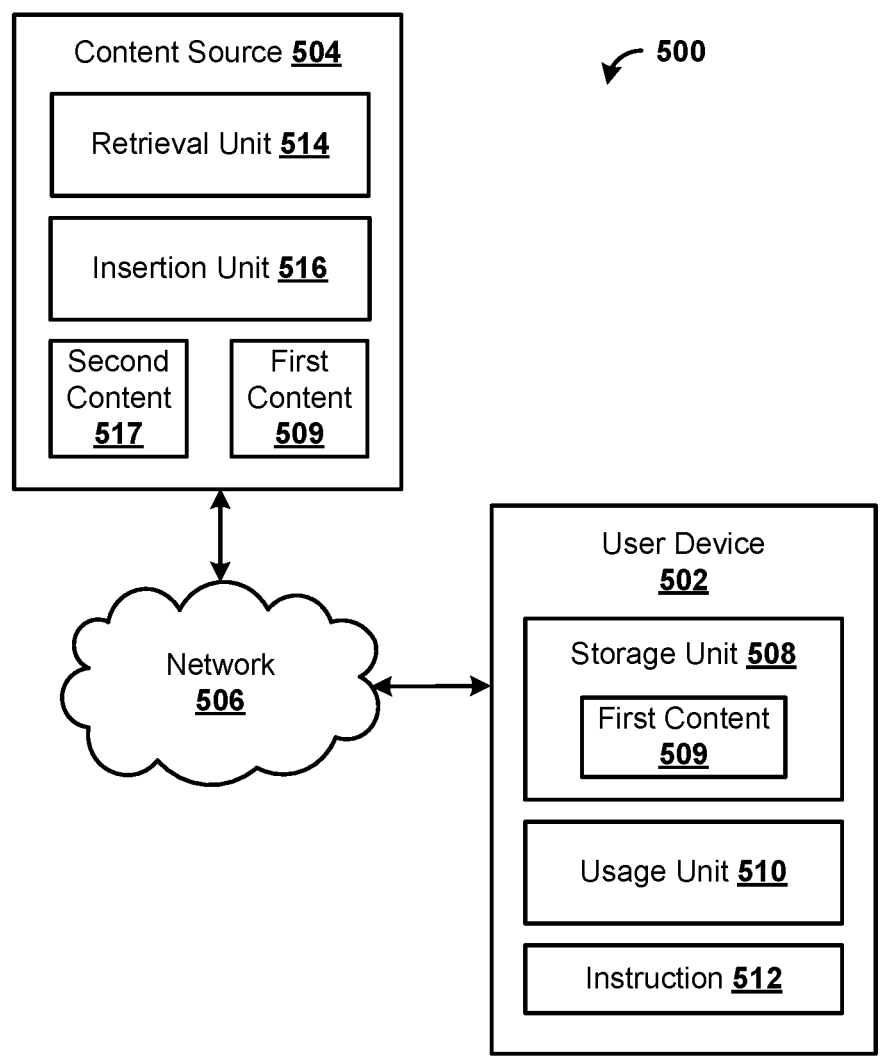
FIG. 5 is a block diagram illustrating an example system for providing content.

FIG. 5 is a block diagram illustrating an example system 500 for providing customized content. Generally, the system 500 can be configured for collection, storage, real-time retrieval of DVR scheduled recordings. The system 500 can be configured to insert advertising on a per-subscriber basis. The system 500 can comprise a control mechanism to manage which viewers receive which content. The system 500 can be configured to substitute advertising content based on user data, such as the schedule of local DVR recordings. For example, users who have a pre-set recording for a particular show will not see promotional spots for said show, but will instead, see other advertising content.

In one aspect, the system 500 can comprise a user device 502 configured to receive content from a content source 504 through a network 506. For example, the network 506 can comprise the distribution system 116 of FIG. 1. The user device 502 can provide the content to a user. The user device 502 can comprise a storage unit 508 configured to store first content 509 received from the content source 504. For example, the storage unit 508 can comprise a digital video recorder configured to store content on the user device 502.

In one aspect, the user device 502 can comprise a usage unit 510 configured to store information about the user device 502 and/or user. The usage unit 510 can store a history of instructions 512 received from the user. For example, in one aspect, the user device 502 can receive an instruction from a user to record and/or store specified first content 509 being broadcast by the content source 504 at a specified day and time. For example, the first content 509 can be scheduled to be broadcast from the content source 504 on a particular day and time. Accordingly, the instruction 512 can indicate the day and time as well as other identifying information, such as a source location, channel broadcasting the content, content identifier, and the like.

Additionally, the instructions 512 can also comprise a request to record content that is currently being broadcast to the user device 502. In another aspect, first content 509 can be prerecorded content stored at the content source 504 accessible upon request of the user device (e.g., video on demand) 502. Thus, the instructions 512 can comprise a request to record the first content 509 as the content is streamed to the user device 502, a request to copy or stream the first content 509 from the content source to the user device 502, or other similar request. Additionally, the usage unit 510 can store information about the user's viewing history for recorded content, streamed content, and/or broadcast content.

In one aspect, the content source 504 can comprise a retrieval unit 512 configured to retrieve the information stored by the usage unit 510 of the user device 502. The retrieval unit 514 can request the information from the user device at regular intervals and/or at the occurrence of a specified event. In another aspect, the user device 502 can be configured to automatically provide the information stored by the usage unit 510. The user device 502 can provide the information to the retrieval unit 514 at regular intervals and/or at the occurrence of a specified event. The user device 502 can also provide the information in near real time. As an example, the user device 502 can provide information to the retrieval unit 514 at the time (e.g., or within a time based on the user device processing capabilities and network bandwidth) the user provides an instruction to the user device 502. In one aspect, the information can be provided through a Session Initiation Protocol (SIP) Inform message, SIP Notify message, SIP Invite message, Simple Network Management Protocol (SNMP) Trap message, an Aloha protocol based message, or the like. The information provided by the user device 502 to the content source 504 can comprise, for example, an identifier of the user device 502, an identifier of the first content 509 that the user is scheduled to record, the scheduled time for recording, and the like.

In another aspect, the content source 504 can comprise an insertion unit 516 configured to insert and/or replace content or content segments within second content 517. The insertion unit 516 can process the information received by the retrieval unit 514. For example, if the information received from the user device 502 indicates that the user device 502 has scheduled to record specific first content 509, the insertion unit 516 can replace a content segment in the second content 517 based on the information. As a further example, if the second content 517 comprises a content segment advertising content X and the user information indicates that the user device 502 is scheduled to record content X, then the insertion unit 516 can replace the content segment with advertising content Y. Thus, the content source 504 can intelligently select other advertising content which may be more appropriate and/or valuable to the advertiser. The content source 504 can then provide the user device 502 with the second content 517 which can comprise one or more replaced and/or updated content segments.

In one aspect, the insertion unit 516 can provide the second content 517 to a plurality of user devices 502. The insertion unit 516 can provide each of the user devices 502 with the second content 517 customized to the particular user device 502 based on the information received by the user device 502. In one aspect, the second content 517 can be provided to each of the user devices 502 through an Internet Protocol (IP) based network. For example, each user device 502 can be associated with a distinct IP address. In another aspect, the content source 504 can provide an instruction to a user device 502 to switch to one or more secondary video streams and/or channels. In one aspect, the secondary video streams can be provided on a quadrature amplitude modulation based content delivery network. For example, the user device 502 can be a set top box (e.g., cable box) configured to switch to the secondary stream based on the instruction from the content source 504. The user device 502 can be configured to switch between streams substantially seamlessly (e.g., with little or no interruption of playback noticeable by an average user).

The plurality of streams can allow customization of content segments to individual users and/or content customization on groups of users. For example, the content source 504 can detect and/or receive geographic information indicating the location of several user devices 502 in the same region and provide a secondary content stream with a content segment relevant to the particular region in which the user devices 502 are located. Then, the content source 504 can provide an instruction to some or all of the user devices 502 in the region to switch to the relevant secondary stream. Additionally, the content segments can be customized based on other information such as user device type, user device preferences, user device history, demographics associated with a user device (e.g., age, nationality, language), and the like.

Figure 6:
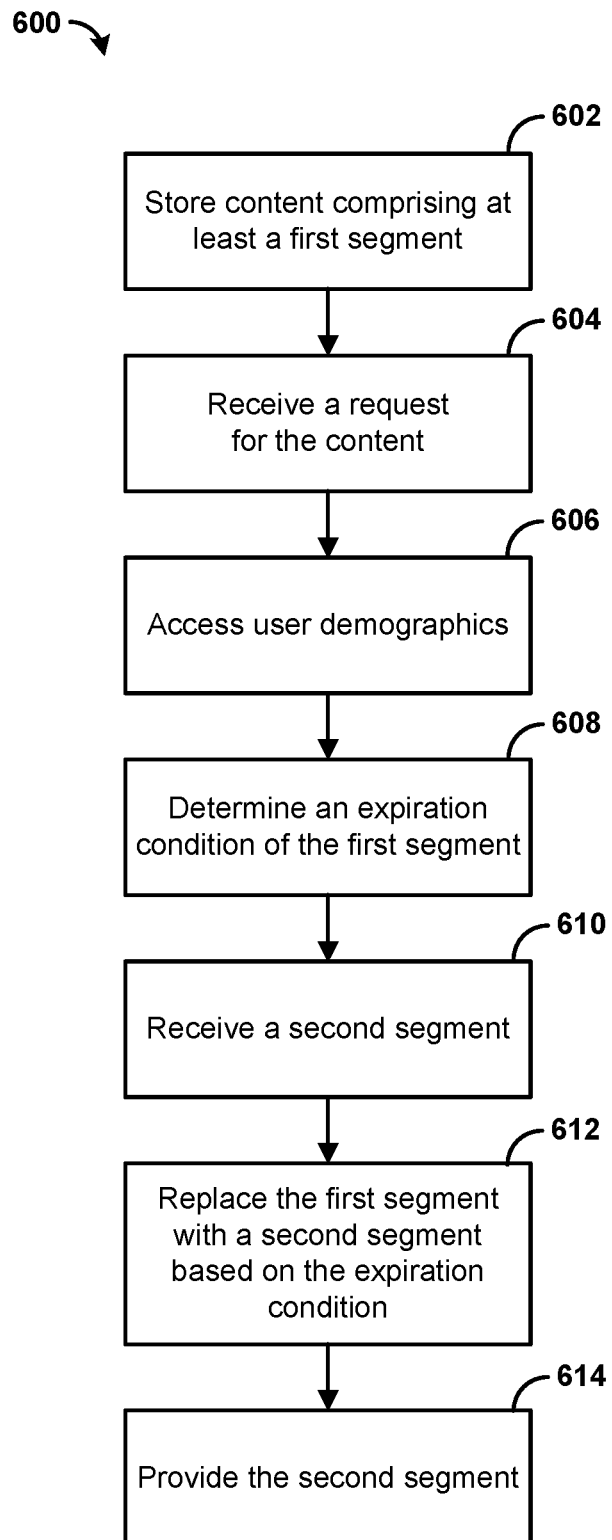
FIG. 6 is a flowchart illustrating an example method for providing content.

FIG. 6 is a flowchart illustrating an example method 600 for providing content. In step 602, content can be stored or otherwise readied for delivery to users or devices. The content can comprise at least a first segment (e.g., advertisement or other content). In one aspect, the content can be received from a content provider. For example, the content can be received through a quadrature amplitude modulation based content distribution and/or access network. In one aspect, the content can be stored on a user device. For example, the content can be stored on a local digital video recorder. The user device can comprise a set top box, digital video recorder, television, digital streaming device, mobile device, tablet device, smart phone, laptop, computing device and/or the like.

In another aspect, the content can be stored on a computer configured to allow access to the content through a cloud computing service. The content can be stored in a cloud space dedicated to a particular user in the cloud computer service. For example, a content provider can store the content on a network device at a remote network location from the user device. The remote network location can be an edge device or other content device of a content delivery network and/or access network.

In step 604, a request for the content can be received. For example, the user can request the content from a device where the content is being stored.

In step 606, user demographics can be accessed (e.g., received, analyzed). User demographics can comprise at least one of geographic location, type of the user device, user preference, content viewing history, language preference, content preferences, and/or the like.

In step 608, an expiration condition of the first segment can be determined. For example, one or more segment markers configured to identify the first segment can be identified in the content. The one or more segment markers can comprise a time expiration marker. The time expiration marker can comprise the expiration condition of the first segment. For example, the expiration condition can comprise an expiration time. In another aspect, the one or more segment markers can comprise an identifier marker. In one aspect, the expiration condition can be based on a change in user demographics.

As another example, in step 608, an expiration notification can be received from a content provider. The expiration notification can comprise an identifier of the first segment. The identifier marker of the first segment can be associated with the identifier of the first segment. For example, the content provider can send the expiration notification to prevent a hardware and/or software problem from occurring due to the first segment and/or computer code associated with the first segment.

In step 610, the second segment (e.g., advertisement or other content) can be received or accessed. For example, the second segment can be received from the content provider through an internet protocol stream, a quadrature amplitude modulation based stream, or other network stream. In another aspect, the second segment can be accessed from a known source, such as a database. In step 612, the first segment can be replaced with the second segment based on the expiration condition. For example, the first segment can be replaced with the second segment if a request time is after the expiration time. The request time can be a time associated with the request for the content. For example, the request time can be the time at which the first segment was requested. As a further illustration, an index file (e.g., manifest file) listing the first segment and/or content fragments thereof (e.g., and the locations for accessing the content segments) can be updated such the second segment (e.g., and/or content fragments thereof) is listed instead of the first segment (e.g., and/or content fragments thereof).

In step 614, the second segment can be provided. The second segment can be provided in response to the request. For example, the second segment can be provided from a user device (e.g., router, set top box, digital video recorder), network device (e.g., network based digital video recorder), and/or the like.

FIG. 7 is a flowchart illustrating an example method 700 for providing content. In step 702, user data (e.g., scheduled recording or prior use data) can be requested from a user device. For example, a content provider can request user data from a user device. In one aspect, the user device can comprise a digital video recorder. In step 704, user data can be received. In one aspect, the user data can indicate first content scheduled to be recorded on a user device. Additionally, user data can comprise at least one of a user identifier, a program identifier of the first content, and a time scheduled for recording the first content on the user device. In one aspect, user data can be received through at least one of a session initiation protocol message, a simple network management protocol message, and a hypertext transfer protocol message.

In step 706, the user data can be processed (e.g., stored, read, analyzed) in a database configured to store user data of a plurality of subscribers. In step 708, a segment (e.g., advertisement or other content) can be inserted into second content based on the user data. For example, a first segment in the second content can be replaced with a second segment. The first segment can be an advertisement related to the first content. For example, if the user data indicates that the user device is scheduled to record the first content, then the first segment may have less value to an advertiser than an advertisement for content that the user devices is not already scheduled to record. As a further illustration, an index file (e.g., manifest file) listing the first segment and/or content fragments thereof (e.g., and the locations for accessing the content segments) can be updated such the second segment (e.g., and/or content fragments thereof) is listed instead of the first segment (e.g., and/or content fragments thereof).

In step 710, the second content having the segment can be provided to the user device. For example, the second content can be provided through a quadrature amplitude modulation based content delivery network. In one aspect, first content and the second content are the same. For example, if the second content comprises an advertisement for the second content, the user can be provided with an advertisement related to other content.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving information associated with a first advertisement, wherein the information comprises an expiration condition associated with the first advertisement;
determining that the first advertisement has expired based on the expiration condition;
based on determining the first advertisement has expired based on the expiration condition, replacing, in content being broadcast to at least a user device, the first advertisement with a second advertisement; and
sending, to the user device, the content comprising the second advertisement.

2. The method of claim 1, wherein at least one of:
the information associated with the first advertisement is received with the first advertisement; or
the information associated with the first advertisement is received with the content.

3. The method of claim 1, wherein the content being broadcast is transmitted to, and received by, at least the user device at substantially a same time.

4. The method of claim 1, further comprising receiving the content, wherein the content comprises the first advertisement and the information associated with the first advertisement.

5. The method of claim 1, further comprising receiving the content from a content provider.

6. The method of claim 1, wherein sending the content comprises sending the content via a non-packet switched network.

7. The method of claim 1, further comprising receiving the second advertisement via a packet switched network.

8. The method of claim 1, wherein the content comprises at least one of:
content to be recorded or stored;
streamed content;
broadcast content;
encoded content;
a movie;
a television show; or
a media clip.

9. The method of claim 1, wherein the expiration condition indicates at least one of:
an expiration time;
a length or duration of time;
a time based on which the first advertisement is no longer valid to be output;
a predetermined number of times the first advertisement is permitted to be output; or
an instruction to replace the first advertisement.

10. The method recited in claim 1, wherein the user device comprises a set top box.

11. A method comprising:
receiving information associated with a first advertisement, wherein the information comprises a condition based on which the first advertisement is no longer valid to be output;
determining that the condition is satisfied;
based on determining the condition is satisfied, replacing, in content being broadcast to at least a user device, the first advertisement with a second advertisement; and
sending, to the user device, the content comprising the second advertisement.

12. The method of claim 11, wherein at least one of:
the information associated with the first advertisement is received with the first advertisement; or
the information associated with the first advertisement is received with the content.

13. The method of claim 11, wherein the content being broadcast is transmitted to, and received by, at least the user device at substantially a same time.

14. The method of claim 11, further comprising receiving the content, wherein the content comprises the first advertisement and the information associated with the first advertisement.

15. The method of claim 11, further comprising receiving the content from a content provider.

16. The method of claim 11, wherein sending the content comprises sending the content via a non-packet switched network.

17. The method of claim 11, further comprising receiving the second advertisement via a packet switched network.

18. The method of claim 11, wherein the content comprises at least one of:
content to be recorded or stored;
streamed content;
broadcast content;
encoded content;
a movie;
a television show; or
a media clip.

19. The method of claim 11, wherein the condition comprises at least one of:
an expiration time;
a length or duration of time;
a change in user demographics;
an instruction to replace the first advertisement; or
a predetermined number of times the first advertisement is permitted to be output.

20. The method of claim 11, wherein the user device comprises a set top box.

21. A method comprising:
evaluating information associated with a first advertisement for content being broadcast to at least a user device, wherein the information comprises an expiration condition associated with the first advertisement;
determining that the first advertisement has expired based on the expiration condition;
based on determining the first advertisement has expired based on the expiration condition, replacing the first advertisement with a second advertisement; and
sending, to a user device, the second advertisement.

22. The method of claim 21, wherein said replacing the first advertisement with the second advertisement is in a content item.

23. The method of claim 22, wherein at least one of:
the second advertisement is sent in the content item; or
the second advertisement and the content item are sent via a non-packet switched network.

24. The method of claim 21, wherein the content being broadcast is transmitted to, and received by, at least the user device at substantially a same time.

25. The method of claim 21, further comprising receiving the second advertisement via a packet switched network.

26. The method of claim 21, wherein the information associated with the first advertisement is received with the first advertisement.

27. The method of claim 21, wherein the expiration condition indicates an expiration time.

28. The method of claim 21, wherein the expiration condition indicates an instruction to replace the first advertisement.

29. The method of claim 21, wherein the second advertisement comprises one or more replacement segments.

30. The method of claim 21, wherein the user device comprises a set top box.

* * * * *